United States Patent [19]

Sisson, Jr.

[11] Patent Number: 5,226,268
[45] Date of Patent: Jul. 13, 1993

[54] ARTIFICIAL FISHING LURES

[75] Inventor: Norman L. Sisson, Jr., Winter Haven, Fla.

[73] Assignee: Fred Arbogast Company, Inc., Akron, Ohio

[21] Appl. No.: 923,132

[22] Filed: Jul. 31, 1992

[51] Int. Cl.⁵ ............................................. A01K 85/00
[52] U.S. Cl. ................................ 43/42.13; 43/42.11
[58] Field of Search .............. 43/42.13, 42.11, 42.14, 43/42.19, 42.47

[56] References Cited

U.S. PATENT DOCUMENTS

| | | | |
|---|---|---|---|
| 2,203,473 | 6/1940 | Shannon | 43/42.13 |
| 3,093,923 | 6/1963 | Jackson | 43/42.11 |
| 4,209,932 | 7/1980 | Pate | 43/42.13 |
| 4,773,180 | 9/1988 | Shimizu | 43/42.13 |
| 5,058,309 | 10/1991 | Firmin | 43/42.13 |
| 5,136,801 | 8/1992 | Pond | 43/42.13 |

*Primary Examiner*—Kurt C. Rowan
*Attorney, Agent, or Firm*—Renner, Kenner, Greive, Bobak, Taylor & Weber

[57] ABSTRACT

An artificial fishing lure. The lure has a bifurcated frame that presents upper and lower arm portions. An eye is presented from the juncture of the upper and lower arm portions. A hook means trails from the lower arm portion, and a spinner blade trails from the upper arm portion. A dive plate has a generally fan-shaped outline with a curvilinear rim that converges to an apex. The apex is connected to the lower arm portion. A sagittally oriented, elongate slot is aligned with the apex and extends toward the rim of the dive plate. The upper arm portion extends through the elongate slot, and a ballast is associated with the lower arm portion.

13 Claims, 2 Drawing Sheets

ARTIFICIAL FISHING LURES

TECHNICAL FIELD

The present invention relates generally to artificial fishing lures. More particularly, the present invention relates to an artificial fishing lure that employs a spinner and yet is adapted for bottom fishing. Specifically, the present invention relates to a spinner type fishing lure which includes a diving plate that adapts the lure for deep water, or "bottom," fishing.

BACKGROUND OF THE INVENTION

Over the past several decades the number of fishing lure configurations available on the commercial market has only been exceeded by the number of persons having an interest, and taking an active part, in the sport of fishing.

Fishing lure types and configurations may be briefly categorized according to the manner in which they are used in the sport of fishing—i.e., they may be cast and retrieved (either along the surface of the water or beneath the surface of the water); or they may be jigged, trolled, floated or remain suspended at a predetermined depth.

To expand further upon the foregoing brief summarization, a lure may be designed to be cast, allowing its weight to draw out the line as the momentum of the cast lure carries it the desired distance over the water surface. One variety of such a lure may then be retrieved on the surface of the water. Such a lure may also incorporate means to generate noise in an effort to attract game fish. On the other hand, such a lure may be configured to be retrieved beneath the surface of the water, and it may still incorporate means to generate noise. It should be appreciated that the configuration itself may serve not only to generate a desired sound but also to impart a specific movement, or action, to the lure as it moves on, or through, the water in order to attract game fish.

Other configurations permit the lure to be jigged; that is, the lure attracts game fish as it is pulled toward the surface and then allowed to drop to a greater or lesser depth. When fished in this way, the shape of the lure may cause it to wiggle or flutter, in a manner deemed attractive to game fish. Generally, a casting-type lure intended to be retrieved on the surface of the water cannot be use effectively as a jigging lure, or vice versa. It is also well known that any or all of the foregoing lure configurations may be enhanced by coloration.

Fishing lure configurations may also be categorized according to the type of equipment with which they will be used. For example, users of bait-casting, spin-casting or purely spinning-type equipment will generally employ lures of sufficient weight to facilitate withdrawal of the line during the cast. These same lures would not be appropriate to a person using fly-rod equipment. The fly-fisherman will choose so-called "flies", or lightweight lures, specifically designed for that type of fishing. Such lures may be much lighter inasmuch as their presentation to a location remote from that of the fisherman is generally accomplished by manipulation of the line so that its driving force is accomplished by the distribution of the weight of the line along its length rather than by the weight of the lure.

From the foregoing discussion it will be appreciated that not every lure will be all things to all fishermen. For that reason a particular lure may be extensively used and accepted by one group of fishermen but not be used or accepted by another group.

However, one particular style of lure has gained wide acceptance and has been effectively used with most all styles of fishing, and that is the spinner. The spinner is a lure, or that portion of a lure, which constitutes an oval blade designed to spin when drawn through the water. The blade generally revolves around a shaft. However, there are some variations in construction. Although the blade-shaped spinner is often mounted in tandem with other lures, the spinner in itself is sufficient to attract game-, and pan-, fish. A spinner creates the illusion of a minnow, or at least something edible, in three ways. It has vibration, flash and motion. Water is a more positive conductor of sound waves than air. External noises, such as a man shouting, bounce off the surface, and fish pay no attention to them. But let the same person step too hard on a hollow bank and the vibrations pass through the earth into the water and into the lateral lines of fish in that general area. Even though the lateral lines of a fish do not function in the same fashion as the angler's ears, the fact remains that fish can hear underwater sounds, and the fish themselves emit vibrations which are audible to other fish. Considering the fact that spinners are often effective in muddy water and after dark, this vibration factor is of great significance. Both the size and the speed at which the blade rotates probably has more to do with earning strikes than its actual appearance in the water. Spinners used for casting are ordinarily from 1-3 inches long, but those made for trolling are often 5 inches and as many as seven of the blade-like spinners may be mounted on the same shaft.

Unlike a spoon, which is a curved blade that breaks rotation because of its shape, and thus wobbles, the spinner is mounted on a shaft so that it rotates in complete revolutions about the shaft (which thus defines the rotational axis of the spinner) when drawn through the water. Therefore, the basic distinction made among spinners is the contour, or outline, of their blades. The contour is important because it determines not only how quickly, or how slowly, the blade turns but also the angle at which it rotates with relation to its rotational axis. A nearly round blade, such as the Colorado blade, rotates rather slowly and at the maximum angle with respect to its rotational axis while the narrow, Willowleaf blade rotates rather quickly and at a relatively small angle with respect to its rotational axis. Between the Colorado and the Willowleaf blade designs are a number of other blade designs that are also oval in shape, such as the Indiana, Idaho, and Bear Valley patterns, but which rotate at an angle of about 45 degrees with respect to their rotational axes.

Spinners are so popular that smaller versions are even employed by fly casting aficionados. However, no consistently effective spinner has been successfully employed for deep water, or bottom, fishing. Fisherman have used the cast-and-count technique for fishing spinners in deep water. That is, the spinner is cast, but retrieval is delayed. To established consistency the fisherman will count at a predetermined rate to a preselected number before initiating retrieval of the lure. By varying the length of the count the fisherman can, to some degree, vary the depth at which retrieval begins. However, the cast-and-count technique is, at best, a makeshift arrangement. For example, as the spinner settles into deeper and deeper water, the line tends to arc downwardly from the surface of the water to the lure so that the lure tends to rise as soon as the retrieval process begins. With some practice an accomplished angler ca develop a modicum of success in keeping the spinner at some depth—as by interrupting the retrieval so that the lure will again descend. With some luck this technique allows a spinner to be fished, at least temporarily, near the bottom, but no technique assures that a conventional spinner will hug the bottom and thereby bounce along and across the surface that constitutes the bottom. Moreover, interruption of the retrieval process stops the desired rotation of the spinner.

SUMMARY OF THE INVENTION

It is, therefore, a primary object of the present invention to provide an improved spinner-type fishing lure which includes a means by which to assure that the lure may be used as a bottom-hugging lure.

It is another object of the present invention to provide an improved spinner-type fishing lure, as above, that employs a dive plate as the means to assure that the lure may be used as a bottom-hugging lure.

It is a further object of the present invention to provide an improved spinner-type fishing lure, as above, wherein the dive plate is pivotally movable fore and aft with respect to the spinner in order to accommodate shock loading between the line and the lure and also to preclude the dive plate from interfering with a strike.

It is still another object of the present invention to provide a spinner-type fishing lure that is basically a bottom-fishing lure which has an overall configuration adapted to maintain the lure in the desired vertical orientation so as to tend to preclude snagging and also to render the lure substantially weedless.

It is yet another object of the present invention to provide an improved spinner-type fishing lure that may be readily adapted for use by a wide variety of fishing styles.

These and other objects of the invention, as well as the advantages thereof over existing and prior art forms, which will be apparent in view of the following detailed specification, are accomplished by means hereinafter described and claimed.

In general, the improved fishing lure embodying the concepts of the present invention utilizes a bifurcated, preferably flexible, body frame that presents upper and lower arm portions. An eye is presented from the juncture of the upper and lower arm portions. A hook means trails from the lower arm portion, and a spinner blade trails from the upper arm portion. A dive plate has a generally fan-shaped outline with a curvilinear rim that converges to an apex. The apex is connected to the lower arm portion. A sagittally oriented, elongate slot is aligned with the apex and extends toward the rim of the dive plate. The upper arm portion of the body frame extends through the elongate slot, and a ballast may be associated with the lower arm portion.

One preferred form of the subject fishing lure is shown by way of example in the accompanying drawings, and is deemed sufficient to effect a full disclosure of the invention. The exemplary lure is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
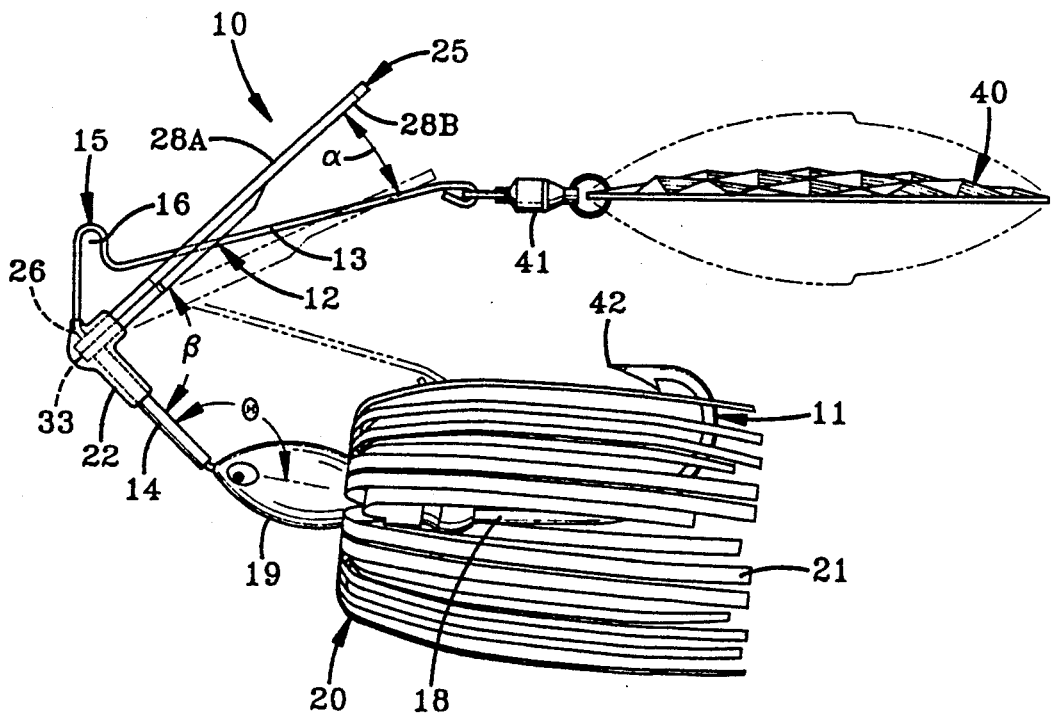
FIG. 1 is a side elevation of a lure embodying the concepts of the present invention.

One representative form of a fishing lure embodying the concepts of the present invention is designated by the numeral 10 on the accompanying drawings. With particular reference to the side elevation of FIG. 1, the subject lure 10 is depicted as having a single hook 11. The body frame 12 of the lure 10 is preferably bifurcated to present upper and lower arm portions 13 and 14. As shown, the body frame 12 can be fabricated from a moderately flexible material, such as spring wire, such that the bifurcated arm portion 13 and 14 extend outwardly from the apex of the body frame 12. As depicted, the apex of the body frame 12 constitutes the juncture 15 of the arm portions 13 and 14.

The arms are designated as being either "upper" or "lower " in order to impart an orientational reference based upon the disposition of the lure 10 as it moves through the water. As depicted in the drawings, the upper arm portion 13 terminates above the hook 11, which trails from the lower arm portion 14 at an angle $\Theta$ which allows the shank 18 of the hook 11 to extend substantially parallel to the direction at which the lure is retrieved. As shown, the angle $\Theta$ may well be approximately 120 degrees. It should be appreciated that even though the exemplary embodiment of the lure 10 employs a single hook 11, double or multiple pronged hooks may also be employed.

The juncture of the upper and lower arm portions 13 and 14 may be formed as an eye 16 to which a fishing line may be attached. The eye 16 may, as shown, be configured as a U-shaped juncture between the upper and lower arm portions 13 and 14, respectively, that extends upwardly for attachment of the line or leader.

Either the lower arm portion 14, or the shank 18 of the hook 11 trailing therefrom, may support a ballast 19. The ballast 19 may be in the nature of a weight that may be cast in situ, or be otherwise secured to either the lower arm portion 14 or the shank 18, and it may, as shown, be decorated to represent a small fish or minnow. A skirt 20 consisting of a plurality of plastic, or rubber-like strands 21, of the type available from the assignee of the present invention under the Hula brand name, is attached to the rearward portion of the ballast 19 to at least partially, or fully, surround at least the shank 18 of the hook 11. In addition to simulating the appearance of a minnow, the ballast 19 associated with the lower arm portion 14 of the body 12 tends to keep the lure 10 in an upright, vertically oriented position as it is fished. This function operation of the ballast is further enhanced by having the eye 16 disposed at a level above the level of the ballast 19 when the lure is being retrieved.

A dive plate 25 is mounted from the medial portion 21 of the lower arm portion 14, just ahead of the ballast 19, and spans both said upper and lower arm portions 13 and 14. As shown, the dive plate 25 may be secured adjacent a dogleg bend 26 in the lower arm portion 14 and extends outwardly therefrom to span between, and engage, the upper arm portion 14.

Figure 2:
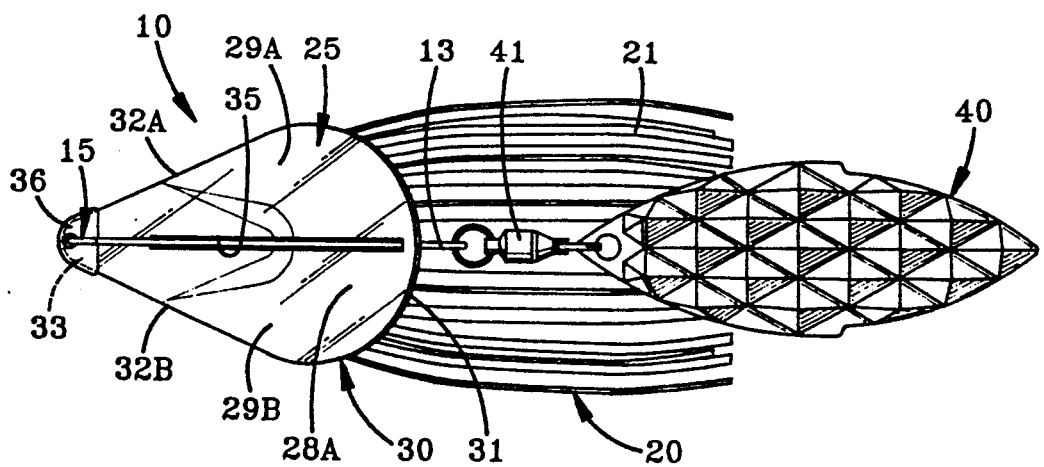
FIG. 2 is a top plan of the lure depicted in FIG. 1.
Figure 3:
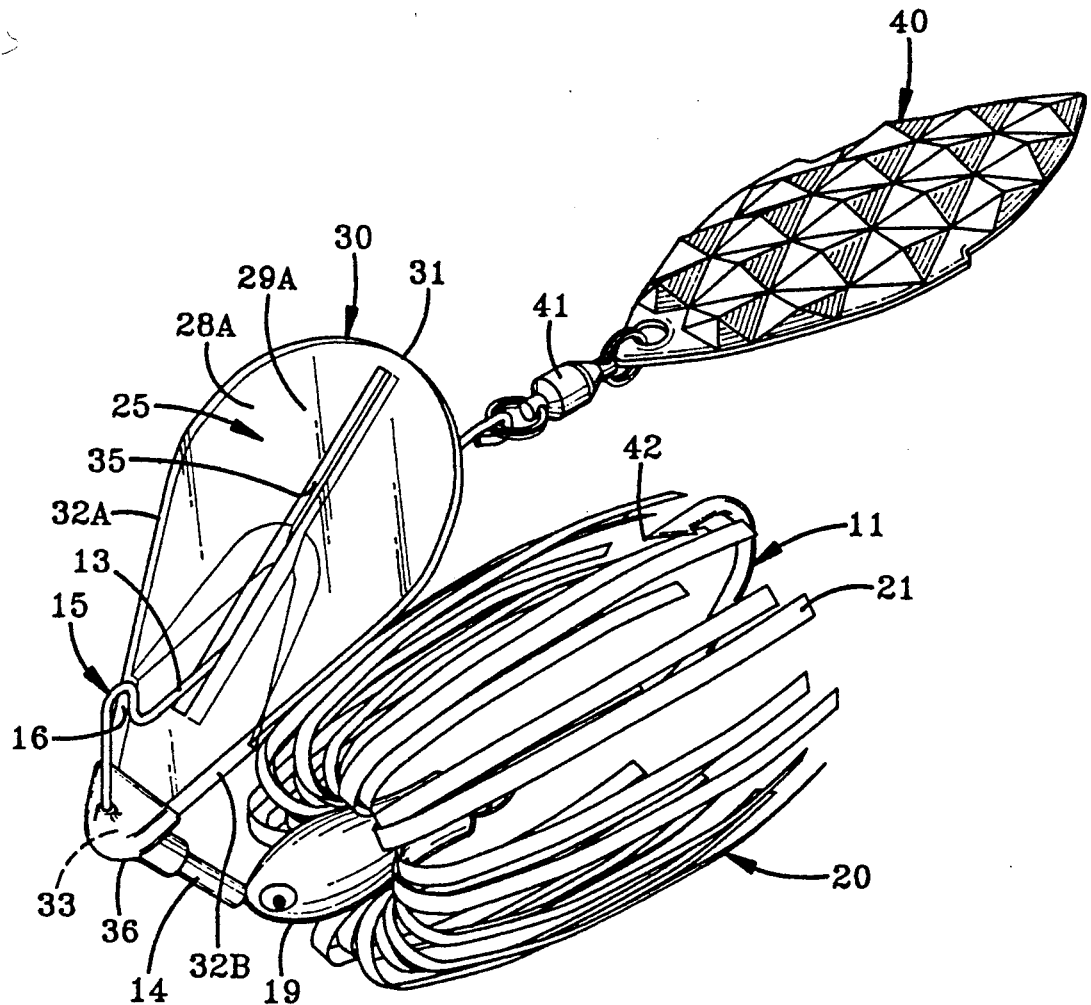
FIG. 3 is a frontal, quartering perspective of the lure depicted in FIGS. 1 and 2.

The dive plate 25 has a generally fan-shaped contour with oppositely facing, planar surfaces 28A and 28B. Although the exact configuration of the dive plate 25 is not critical so long as it serves to cause the lure 10 to descend in response to retrieval of the lure, one configuration that has been found to work quite well is that shown on the drawings. That is, the fan-shaped contour, as best seen in FIGS. 2 and 3, includes lateral lobes 29A and 29B that are defined by the curvilinear rim 30. The curvilinear rim 30 may include an arcuate portion 31 that tangentially merges into converging linear portion 32A and 32B which, in turn, meet at the apex 33.

The aforesaid configuration of the dive plate 25 may be conveniently molded in one piece from a plastic material, but irrespective of how it is made, the dive plate 25 preferably has an elongate, sagittal slot 35 which extends between the lateral lobes 29A and 29B of the dive plate 25. The sagittal slot 35 is preferably aligned with the apex 33 and extends toward the curvilinear rim 30. In order to maintain the integrity of the dive plate 25 when it is fabricated from a relatively thin plastic material, it is preferable that the slot 35 does not penetrate the curvilinear rim 30.

The upper arm portion 13 extends through the elongate slot 35 to be freely slidable within, and along, the slot 35. The dive plate 25 is preferably mounted to pivot fore and aft on the lower arm portion 14. Fore the aft pivotal movement of the dive plate 25 may be accomplished by attaching the apex 33 of the dive plate 25 to the lower arm portion 14 with a boot 36 formed from a flexible, plastic material such as silicone rubber. By virtue of the boot 36 the dive plate 25 may pivot fore and aft through an angle of about 30 degrees, as designated by the angle $\alpha$ in FIG. 1. When the dive plate 25 is disposed in its normal position, as represented by the solid line rendition in FIG. 1, it projects upwardly at an angle of approximately 90 degrees, as designated by the angle $\beta$ in FIG. 1, relative to the lower arm portion 14, and the upper arm portion 13 extends through the elongate, sagittal slot 35, also as shown in FIGS. 1 through 3. The aft, flexed position of the dive plate 25 is shown in phantom lines in FIG. 1.

A spinner blade 40 is attached to the distal extremity of the upper arm portion 13, as by a swivel 41. The spinner blade 40 is depicted as embodying the Willowleaf contour for rapid, free rotation when the lure is drawn through the water, and the spinner blade 40 is preferably mounted in a position just over, and closely adjacent to, the hook 11. This position does not interfere with a strike inasmuch as the upper arm portion 13 may also flex independently of the dive plate 25. For example, should a fish strike, the upper arm portion 13 may readily flex below the level of the point 42 on hook 11, as is also shown in phantom lines in FIG. 1.

When the aforesaid lure 10 is drawn through the water the dive plate 25 will cause the lure 10 to descend and permit the lure 10 to be fished in deeper water than one has heretofore been conveniently able to fish a conventional spinner. As such, a lure embodying the concepts of the present invention can be fished as a bottom-hugging lure in most inland lakes. Such a lure, therefore, offers many unique advantages and capabilities not found in the prior art. In particular, the present lure presents considerable life-like motion to attract fish, especially bottom feeders, and under conditions when fish are located near the bottom. Many other ways of using and fishing a lure embodying the present invention will become apparent to those knowledgeable in this art, and the scope of the invention should not be limited in any way by the manner in which the structure, or use, of the lure has been described.

As should now be apparent, the present invention not only discloses an improved spinner-type, artificial fishing lure that includes a means by which to assure that it may be used as a bottom-hugging lure but also accomplishes the other objects of the invention.

I claim:

1. An artificial fishing lure comprising:
   a body frame;
   said body frame being bifurcated to present first and second arm portions;
   hook means being mounted on one of said arm portions;
   a spinner being mounted from the other of said arm portions;
   a dive plate being mounted from one said arm portions;
   said dive plate having an elongate slot; and,
   the other of said arm portions extending through said elongate slot to provide for relative movement between said dive plate and said arm portion that extends through said elongate slot.

2. An artificial fishing lure comprising:
   a body frame;
   said body frame being bifurcated to present upper and lower arm portions;
   hook means being mounted on said lower arm portion;
   a spinner being mounted from said upper arm portion;
   a dive plate being mounted from said lower arm portion;
   said dive plate having an elongate slot; and,
   said upper arm portion extending through said elongate slot to provide for relative movement between said dive plate and said upper arm portion.

3. An artificial fishing lure, as set forth in claim 2, wherein said dive plate and said lower arm portion are relatively movable.

4. An artificial fishing lure, as set forth in claim 3, wherein a flexible boot secures said dive plate to said lower arm portion to permit said dive plate to pivot with respect to said lower arm portion while said upper arm portion is slidably received within said elongate slot.

5. An artificial fishing lure, as set forth in claim 4, wherein said upper arm portion is flexible to permit said upper arm portion to slide along said elongate slot even when said dive plate remains fixed positioned with respect to said lower arm portion.

6. An artificial fishing lure, as set forth in claim 5, wherein a ballast is operatively associated with said lower arm portion to assist in maintaining the relative vertical disposition of said upper and lower arm portions.

7. An artificial fishing lure, as set forth in claim 6, wherein
   an eye is provided at the juncture of said bifurcated upper and lower arm portions; and,
   said eye is disposed at a level above the level of said ballast when said lure is being retrieved.

8. An artificial fishing lure, as set forth in claim 7, wherein a skirt is mounted in association with said lower arm portion.

9. An artificial fishing lure comprising:
   a bifurcated frame having upper and lower arm portions;

an eye presented from the juncture of said upper and lower arm portions;

hook means trailing from said lower arm portion;

a spinner blade trailing from said upper arm portion;

a dive plate having a generally fan shaped outline with a curvilinear rim that converges to an apex;

said apex being operatively connected to said lower arm portion;

a sagittally oriented, elongate slot aligned with said apex and extending toward said rim;

said upper arm portion extending through said elongate slot.

10. An artificial fishing lure, as set forth in claim 9, wherein the upper and lower arm portions comprise a flexible material;

said arm portions are conjoined at a juncture; and, an eye is presented from said juncture.

11. An artificial fishing lure, as set forth in claim 10, wherein a flexible boot secures the apex of said dive plate to said lower arm portion to permit said dive plate to pivot with respect to said lower arm portion while said upper arm portion is slidably received within said elongate slot.

12. An artificial fishing lure, as set forth in claim 11, wherein:

said lower arm portion has a dogleg bend between said juncture and said hook means;

said flexible boot being secured to said dogleg bend.

13. An artificial fishing lure, as set forth in claim 12, wherein a ballast is operatively associated with said lower arm portion to assist in maintaining the relative vertical disposition of said upper and lower arm portions.

* * * * *